(12) United States Patent
Knauth et al.

(10) Patent No.: US 8,924,692 B2
(45) Date of Patent: Dec. 30, 2014

(54) EVENT COUNTER CHECKPOINTING AND RESTORING

(75) Inventors: Laura A. Knauth, Portland, OR (US);
Ravi Rajwar, Beaverton, OR (US);
Konrad K. Lai, Vancouver, WA (US);
Martin G. Dixon, Portland, OR (US);
Peggy Irelan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 844 days.

(21) Appl. No.: 12/655,204

(22) Filed: Dec. 26, 2009

(65) Prior Publication Data
US 2011/0161639 A1  Jun. 30, 2011

(51) Int. Cl.
*G06F 9/38* (2006.01)
*G06F 9/46* (2006.01)
*G06F 11/34* (2006.01)

(52) U.S. Cl.
CPC .............. *G06F 9/3863* (2013.01); *G06F 9/466* (2013.01); *G06F 9/3861* (2013.01); *G06F 11/3466* (2013.01); *G06F 2201/86* (2013.01); *G06F 2201/87* (2013.01); *G06F 2201/88* (2013.01)
USPC ........................................................ 712/220

(58) Field of Classification Search
CPC ................................ G06F 9/3861; G06F 9/466
USPC ........................................................ 712/220
See application file for complete search history.

(56) References Cited

U.S. PATENT DOCUMENTS

| | | | |
|---|---|---|---|
| 6,910,120 B2 * | 6/2005 | Le et al. | 712/216 |
| 6,941,489 B2 | 9/2005 | DeLano | |
| 7,086,035 B1 * | 8/2006 | Mericas | 717/127 |
| 2005/0050304 A1 | 3/2005 | Mukherjee et al. | |
| 2005/0120179 A1 | 6/2005 | Akkary et al. | |
| 2005/0120191 A1 | 6/2005 | Akkary et al. | |
| 2006/0041786 A1 | 2/2006 | Janakiraman et al. | |
| 2006/0085588 A1 | 4/2006 | Rajwar et al. | |
| 2007/0143287 A1 | 6/2007 | Adl-tabatabai et al. | |
| 2007/0156994 A1 | 7/2007 | Akkary et al. | |
| 2007/0239942 A1 | 10/2007 | Rajwar et al. | |
| 2007/0260907 A1 | 11/2007 | Dixon et al. | |
| 2007/0260942 A1 | 11/2007 | Rajwar et al. | |
| 2008/0115042 A1 | 5/2008 | Akkary et al. | |
| 2008/0172549 A1 * | 7/2008 | Caprioli et al. | 712/216 |
| 2008/0244544 A1 | 10/2008 | Neelakantam et al. | |
| 2010/0023707 A1 * | 1/2010 | Hohmuth et al. | 711/152 |

OTHER PUBLICATIONS

Diestelhorst and Hohmuth; "Hardware acceleration for lock-free data structures and software-transactional memory"; 2008; IEEE.*
"NITROX II", *Cavium Networks*, http://www.caviumnetworks.com/processor_security_nitroxII.htm (Nov. 11, 2009), (2000-2009), 1 pg.

(Continued)

*Primary Examiner* — Andrew Caldwell
*Assistant Examiner* — Benjamin Geib
(74) *Attorney, Agent, or Firm* — Lowenstein Sandler LLP (57) ABSTRACT

A method of one aspect may include storing an event count of an event counter that counts events that occur during execution within a logic device. The method may further include restoring the event counter to the stored event count after the event counter has counted additional events. Other methods are also disclosed. Apparatus, systems, and machine-readable medium having software are also disclosed.

23 Claims, 8 Drawing Sheets

(56) References Cited

OTHER PUBLICATIONS

"Software Optimization Guide for AMD Family 10h Processors", *Advanced Micro Devices, Publication 40546 Revision 3.09*, (Nov. 2008), pp. i-xviii & 1-316.
"Software Optimization Resources", http://www.agner.org/optimize (Jan. 5, 2010), (2009), 1-5.
"The SPARC Architecture Manual, Version 8", *SPARC International, Inc.*, (1991, 1992), pp. 1-303.
"UltraSPARC Cryptographic Performance", *UltraSPARC cryptographic accelerators-Wikipedia*, http://wikis.sun.com/display/CryptoPerf/UltraSPARC+cryptographic+performance (Nov. 11, 2009), (Jul. 8, 2008), pp. 1-5.
"VIA Nano Processor", *VIA Technologies, Inc.*, (2008), pp. 1-15.
Fog, Agner, "Optimization Manual 4 Instruction Tables", *Copenhagen University College of Engineering*Software Optimization Resources, http://www.agner.org/optimize (Jan. 5, 2010), (1996-2009), pp. 1-154.
Henry, G. G., "The VIA Isaiah Architecture", *Centaur Technology, Inc.*, (Jan. 2008), pp. 1-12.
Rajwar, Ravi et al., "Speculative Lock Elision: Enabling Highly Concurrent Multithreaded Execution" 34th International Symposium on Microarchitecture(MICRO), Dec.3-Dec. 5, 2001, Austin, TX, 12 pgs.
"Transactional Memory 101" Transactional Memory 101: Reading 6.Lock Elision Apr. 25, 2008, http://tm-101.blogspot.com/2008/04/reading-6-lock-elision.html , Dec. 18, 2009, pp. 1-5.
Intel, "Intel 64 and IA-32 Architectures Software Developer's Manual vol. 3B: System Programming Guide, Part 2" Sep. 2009, Order No. 253669-032US, pp. i-ii and 30-1-30-100 and A-1.

\* cited by examiner

EVENT COUNTER CHECKPOINTING AND RESTORING

BACKGROUND

1. Field

Embodiments of the invention relate to methods of event counting or logic devices having event counters. In particular, one or more embodiments relate to methods of event counting with checkpointing and restoring or logic devices having event counters that capable of being checkpointed and restored.

2. Background Information

Some processors include event counters. The event counters count events that occur during execution. By way of example, the events may include instructions retired, branch instructions retired, cache references, cache misses, or bus accesses, to name just a few examples.

Figure 1:
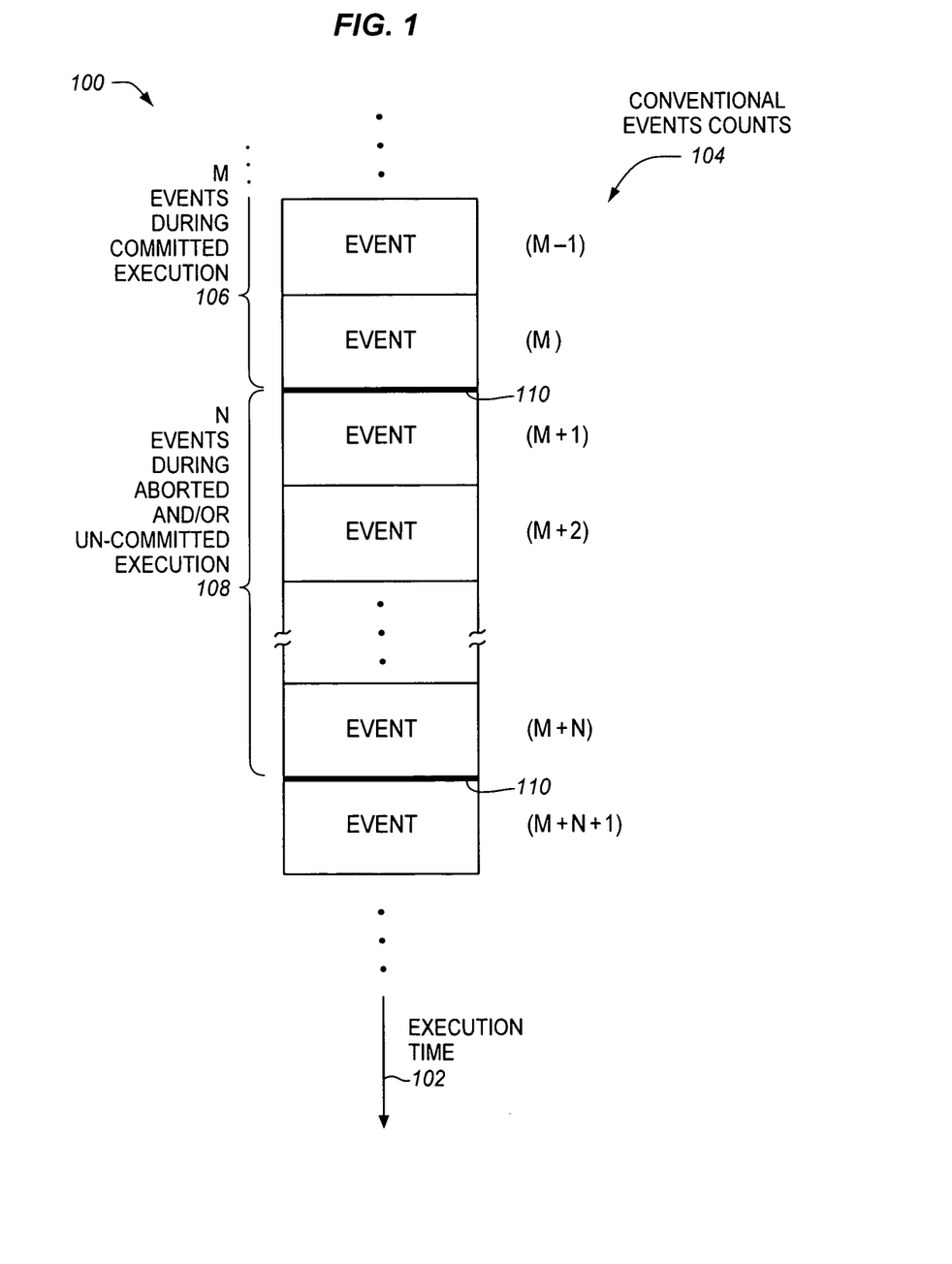
FIG. 1 is a block diagram illustrating a conventional approach for counting events in a logic device.

FIG. 1 is a block diagram illustrating a conventional approach 100 for counting events in a logic device. The events occur in sequence from top to bottom during execution time 102.

Conventional event counts 104 of a conventional event counter are shown to the right-hand side in parenthesis. Initially, M events 106 occur and are counted during committed execution. Subsequently, N events 108 occur and are counted during execution that is ultimately aborted and/or un-committed. Bold lines 110 demarcate the N events that occur during the execution that is ultimately aborted and/or un-committed. As shown, the event counter would count through the values (M−1), (M), (M+1), (M+2), . . . (M+N), (M+N+1).

The conventional event counter counts all events that occur during both committed and un-committed execution in the final event count. Notice in the illustration that the event counter counts the event immediately following the N events that occur during the execution that is ultimately aborted and/or un-committed as (M+N+1).

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 2:
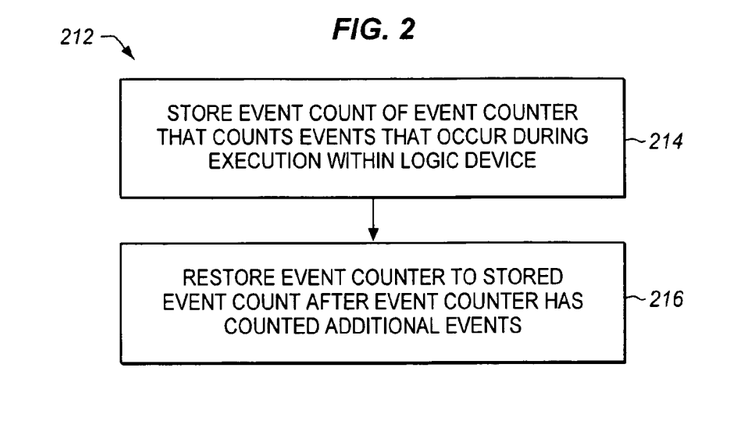
FIG. 2 is a block flow diagram of an embodiment of a method of counting events in a logic device.

FIG. 2 is a block flow diagram of an embodiment of a method 212 of counting events in a logic device. In various embodiments, the method may be performed by a general-purpose processor, a special-purpose processor (e.g., a graphics processor or a digital signal processor), a hardware accelerator, a controller, or another type of logic device.

At block 214, an event count of an event counter may be stored. The event counter may count events that occur during execution within the logic device.

Then, the event counter may be restored to the stored event count, at block 216. Typically, the event counter has counted additional events between the time the event count was stored and the time the event count was restored.

Advantageously, the ability to store and restore the event count of the event counter may allow certain events to be excluded from the final event count. In one or more embodiments, events during aborted and/or un-committed execution, which is not committed to final program flow, may be excluded. For example, in one or more embodiments, events during aborted and/or un-committed speculative execution may be excluded from the final event count. Alternatively, events during other types of execution may optionally be excluded from the final event count.

Figure 3:
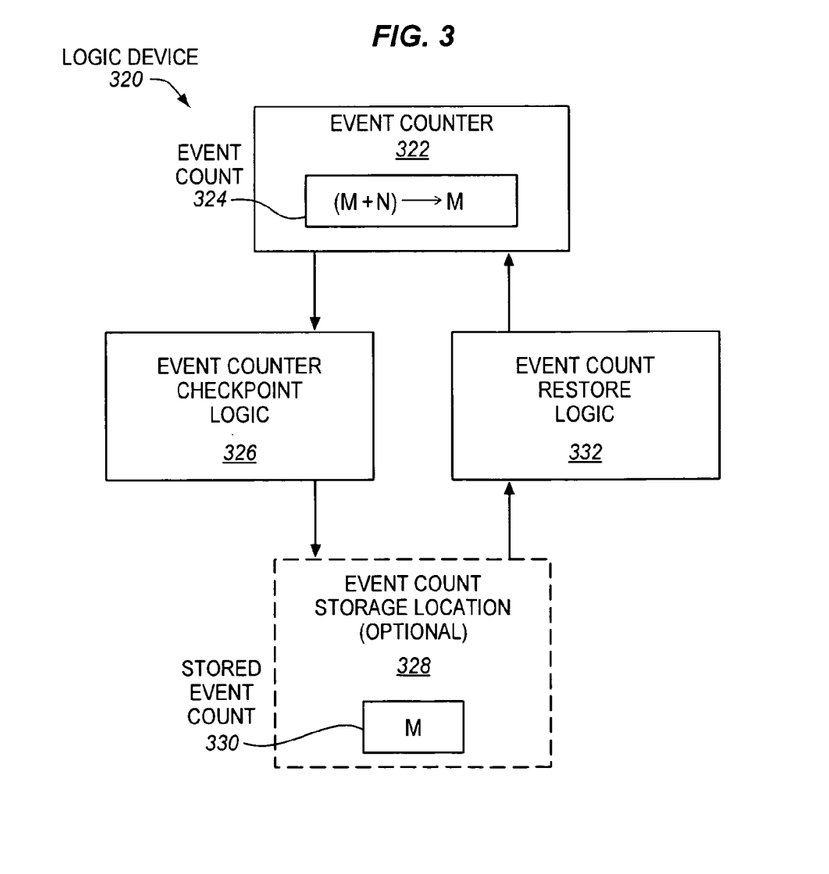
FIG. 3 is a block diagram of an embodiment of a logic device.

FIG. 3 is a block diagram of an embodiment of a logic device 320. In various embodiments, the logic device may include a general-purpose processor, a special-purpose processor (e.g., a graphics processor or a digital signal processor), a hardware accelerator, a controller, or another type of logic device. In one or more embodiments, the logic device has out-of-order execution logic.

The logic device has an event counter 322. The event counter may count events that occur during execution within the logic device. For example, the counter may be incremented each time an event of a specific type occurs. The event counter has an event count 324.

Suitable event counters are known in the arts. The event counters are sometimes referred to in the arts as event monitoring counters, performance monitoring counters, or simply performance counters. Further information on particular examples of suitable performance monitoring counters, if desired, is available in Intel® 64 and IA-32 Architectures Software Developer's Manual, Volume 3B, System Programming Guide, Part 2, Order Number 253669-032US, September 2009. See e.g., Chapters 20 and 30, and Appendices A-B. In one or more embodiments, the event counter is a hardware counter and/or includes circuitry.

Event counter checkpoint logic 326 is coupled with, or otherwise in communication with, the event counter 322. A brief explanation of the term "coupled" may be helpful. The term "coupled" is broader than the term "connected". As used herein, the term "connected" means that two or more elements are in direct physical or electrical contact. Likewise, the term "coupled" may mean that two or more elements are in direct physical or electrical contact. However, the term "coupled" may also mean that two or more elements are not in direct physical or electrical contact, but may still co-operate, interact, or communicate with one other. For example, the event counter and the event counter checkpoint logic may be coupled with one another through one or more intervening components.

The event counter checkpoint logic 326 is operable to store the event count 324 of the event counter 322. The term "checkpoint" is sometimes used to mean different things. For clarity, as used herein, the term "checkpointing," as in the phrase checkpointing an event count, is intended to mean that the event count is stored or otherwise preserved. Likewise, the "event counter checkpoint logic" is intended to mean that the logic is operable to store or otherwise preserve the event count. In other words, the term checkpointing as used herein is not intended to inherit additional meaning other than what is explicitly stated herein.

As shown, in one or more embodiments, the logic device may optionally have an event count storage location 328 to store an event count 330. In one or more embodiments, the event count storage location may include one or more special-purpose registers (e.g., one or more dedicated event counter registers) located on-die with the logic device. Alternatively, in one or more embodiments, the event count storage location may not be part of the logic device. For example, the event count storage location may be part of system memory.

An event count restore logic 332 is coupled with, or otherwise in communication with, the event counter. Also, in the particular illustrated embodiment, the event count restore logic is coupled with, or otherwise in communication with, the optional event count storage location.

The event count restore logic is operable to restore the event count 324 of the event counter 322 to the stored event count 330. In the illustration, the particular stored event count 330 is M. The illustration also shows an example of restoring the event count 324 of the event counter 322 from the value (M+N) back to the stored event count value of M. In this example, N may represent a count of events that occur in aborted and/or un-committed execution which are excluded from the final event count.

One area in which embodiments disclosed herein may find great utility is in the area of speculative execution. Speculative execution generally refers to the execution of code speculatively before being certain that the execution of this code should take place and/or is needed. Such speculative execution may be used to help improve performance and tends to be more useful when early execution consumes lesser resources than later execution would, and the savings are enough to compensate for the possible wasted resources if the execution was not needed. Performance tuning inside speculative regions tends to be challenging partly because it is difficult to distinguish event counts that occur during speculative regions that are not committed to final execution from events that occur during speculative regions that are committed to final execution.

Speculative execution is used for various different purposes and in various different ways. As one example, speculative execution is often used with branch prediction.

Figure 4:
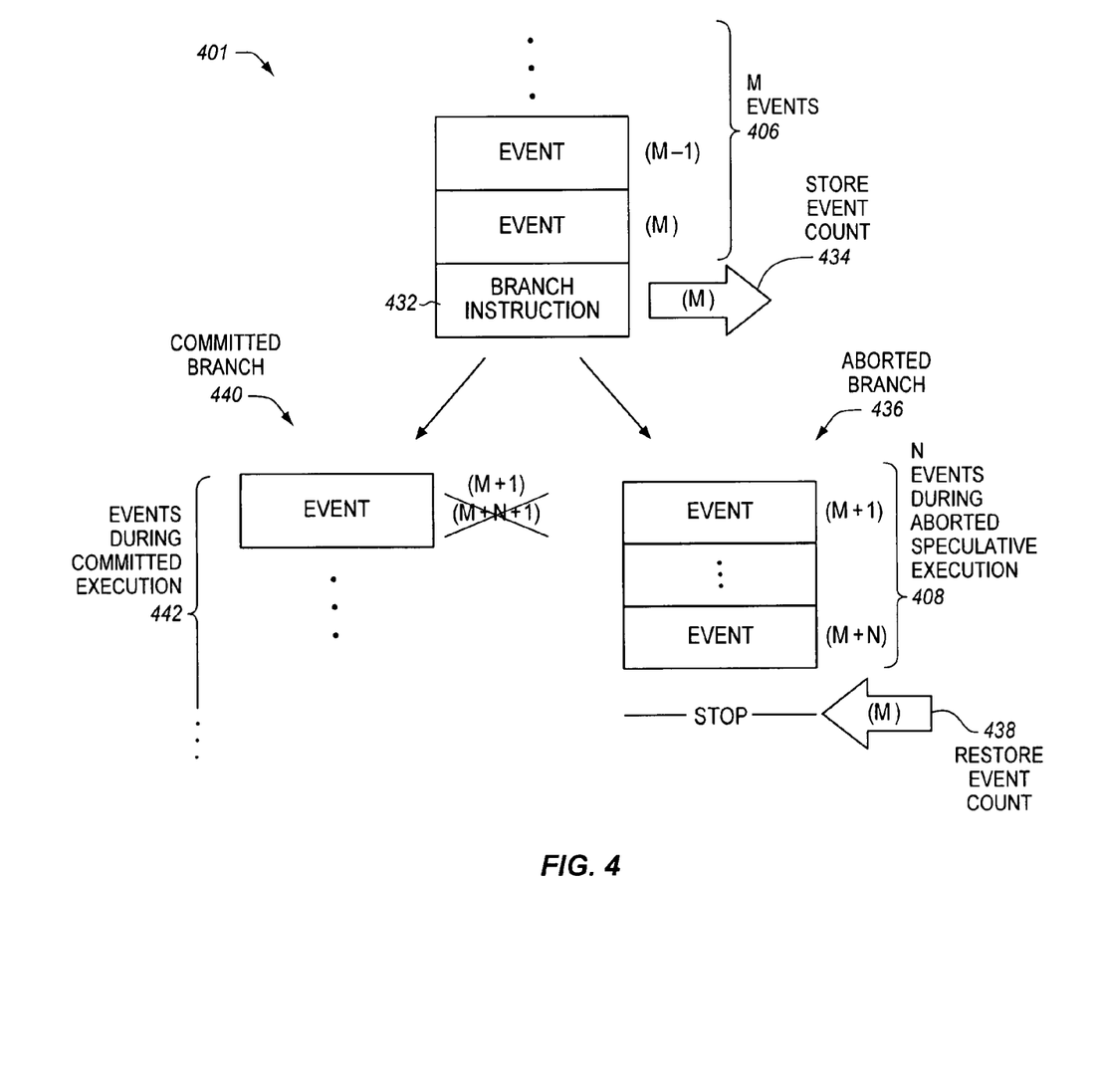
FIG. 4 is a block diagram illustrating an example embodiment of counting events during speculative execution performed in conjunction with branch prediction.

FIG. 4 is a block diagram illustrating an example embodiment 401 of counting events during speculative execution performed in conjunction with branch prediction.

Initially, M events 406 may be counted by an event counter prior to a conditional branch instruction (or other control flow instruction) 432. The conditional branch instruction results in a branch in program flow. In the illustration two branches are shown.

When the conditional branch instruction is encountered, the logic device may not know which of the two branches is the correct branch to be taken. Instead, branch prediction may be used to predict which branch is the correct branch. Then speculative execution may be performed earlier assuming that the predicted branch is correct. If the predicted branch is later confirmed to be correct, then the speculative execution may be committed to final code flow. Otherwise, if the predicted branch is later determined to be incorrect, then the speculative execution of the incorrect branch may be aborted. All computation past the branch point may be discarded. This execution is un-committed execution that is not committed to final code flow. Execution may then be rolled back and the correct branch may be executed un-speculatively. Checkpointing may be used to record the architectural state prior to the speculative execution so that the architectural state may be rolled back to the state it was at prior to the speculative execution. Checkpointing is traditionally used for such fault tolerance, but as previously described event counters are not traditionally checkpointed. Such branch prediction and speculative execution is well known in the arts.

Referring again to the illustration, after encountering the branch instruction 432, and before counting events for the initially predicted branch, in accordance with one or more embodiments, the event count (M) of the event counter may be checkpointed or stored 434. In one or more embodiments, a conditional branch instruction, or other control flow instruction, may represent a trigger to cause the logic device to checkpoint the event counter.

Then, the branch 436 on the right-hand side (in this particular case), which is the initially predicted branch, may be executed speculatively. As shown, N additional events 4 may be counted by the event counter before the speculative execution is stopped (e.g., it is determined that this branch is incorrect). The speculative execution for this branch may be aborted and not committed to final code flow. As shown, the value of the event counter when the last event of this branch was counted may be (M+N).

After deciding to abort the initially predicted branch, and before counting events of the committed branch 440, in accordance with one or more embodiments, the previously stored event count (M) of the event counter may be restored 438. In one or more embodiments, a decision to abort a speculatively executed branch may represent a trigger to cause the logic device to restore the event counter to a stored event count. The stored event count (M) may then be discarded. The stored event count (M) may also be discarded if alternatively the speculative execution discussed above was committed instead of aborted. Without limitation, the program counter, registers, stacks, altered memory locations, as well as other parameters traditionally checkpointed during such speculative execution, may also be restored to their checkpointed values, although the scope of the invention is not limited in this regard.

Execution may then resume un-speculatively with the committed branch 440 on the left-hand side (in this particular case). The committed branch is now known to be the correct branch. The execution of the committed branch is committed to final code flow. As shown, the event counter, upon counting the first event of the committed branch, may have the event count (M+1), instead of (M+N+1), which would be the case if the N events counted during the aborted speculative execution were not excluded.

Figure 5:
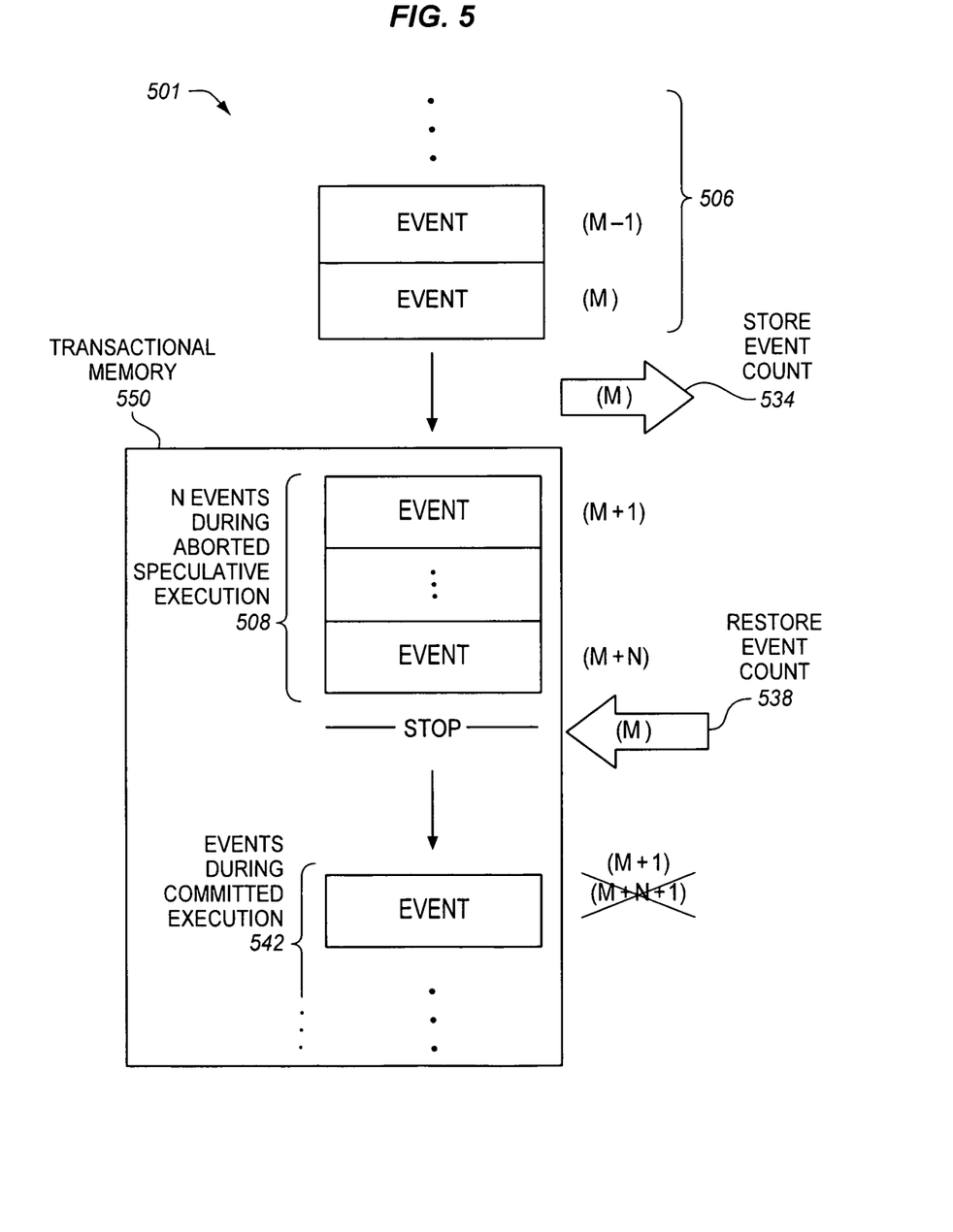
FIG. 5 is a block diagram illustrating an example embodiment of counting events during speculative execution performed in conjunction with execution in a transactional memory.

As another example, speculative execution is often performed in conjunction with transactional memory. FIG. 5 is a block diagram illustrating an example embodiment 501 of counting events during speculative execution performed in conjunction with execution in a transactional memory 550.

Initially, M events 506 may be counted by an event counter. The count (M) may represent a positive integer. Then a determination to perform transactional memory execution may be made.

Transactional memory execution is known in the arts. A detailed understanding of transactional memory execution is not needed to understand the present disclosure, although a brief overview may be helpful.

Some logic devices may execute multiple threads concurrently. Traditionally, before a thread accesses a shared resource, it may acquire a lock of the shared resource. In situations where the shared resource is a data structure stored in memory, all threads that are attempting to access the same resource may serialize the execution of their operations in light of mutual exclusivity provided by the locking mechanism. Additionally, there tends to be high communication overhead. This may be detrimental to system performance and/or in some cases may cause program failures, e.g., due to deadlock.

To reduce performance loss resulting from utilization of locking mechanisms, some logic devices may use transactional memory. Transactional memory generally refers to a synchronization model that may allow multiple threads to concurrently access a shared resource without utilizing a locking mechanism. Transactional memory may provide speculative lock elision. In transactional memory execution code may be executed speculatively within a transactional memory region without the lock. Checkpointing may be used to record the architectural state prior to the speculative execution so that the architectural state may be rolled back to the state it was at prior to the speculative execution if failure or abort occurs. If the speculative execution succeeds, the performance impact of locks may be elided. If the speculative execution is aborted, such as, for example, another component or process acquires the lock, the checkpointed architectural state may be restored. The code may then be executed un-speculatively in the transactional memory region.

Referring again to the illustration, after determining to perform transactional memory execution, and before counting events during the transactional memory execution, in accordance with one or more embodiments, the event count (M) of the event counter may be checkpointed or stored 534. In one or more embodiments, a determination to perform transactional memory execution, may represent a trigger to cause the logic device to checkpoint the event counter.

Then, the execution may be performed in the transactional memory speculatively. As shown, N additional events 508 may be counted by the event counter before the speculative execution in the transactional memory is stopped or aborted. The speculative transactional memory execution may not be committed to final code flow. As shown, the value of the event counter when the last event was counted may be (M+N).

After deciding to abort the speculative transactional memory execution, and before counting additional events, in accordance with one or more embodiments, the previously stored event count (M) of the event counter may be restored 538. In one or more embodiments, a decision to abort speculative transactional memory execution may represent a trigger to cause the logic device to restore the event counter to a stored event count. The stored event count (M) may then be discarded. The stored event count (M) may also be discarded if alternatively the speculative execution discussed above was committed instead of aborted. Without limitation, the program counter, registers, stacks, altered memory locations, as well as other parameters traditionally checkpointed during such speculative execution, may also be restored to their checkpointed values, although the scope of the invention is not limited in this regard.

Execution may then resume un-speculatively and one or more events may be counted during committed execution 542. As shown, the event counter, upon counting the first event, may have the event count (M+1), instead of (M+N+1), which would be the case if the N events counted during the aborted speculative transactional memory execution were not excluded.

Often in such speculative transactional memory execution, the number of instructions speculatively executed and aborted is not on the order of tens to hundreds of instructions, but generally tends to be larger, such as, for example, often ranging from tens to hundreds of thousands, or even millions. As a result, the events detected during the aborted and/or un-committed execution may represent a significant proportion of the total events. Advantageously, the embodiment of the event counter described, which is able to exclude events during aborted and/or un-committed execution and selectively count events during committed execution may help to improve understanding and/or performance of the logic device.

These aforementioned examples of speculative execution are only a few illustrative examples of ways in which speculative execution may be used. It is to be appreciated that speculative execution may also be used in other ways.

Figure 6:
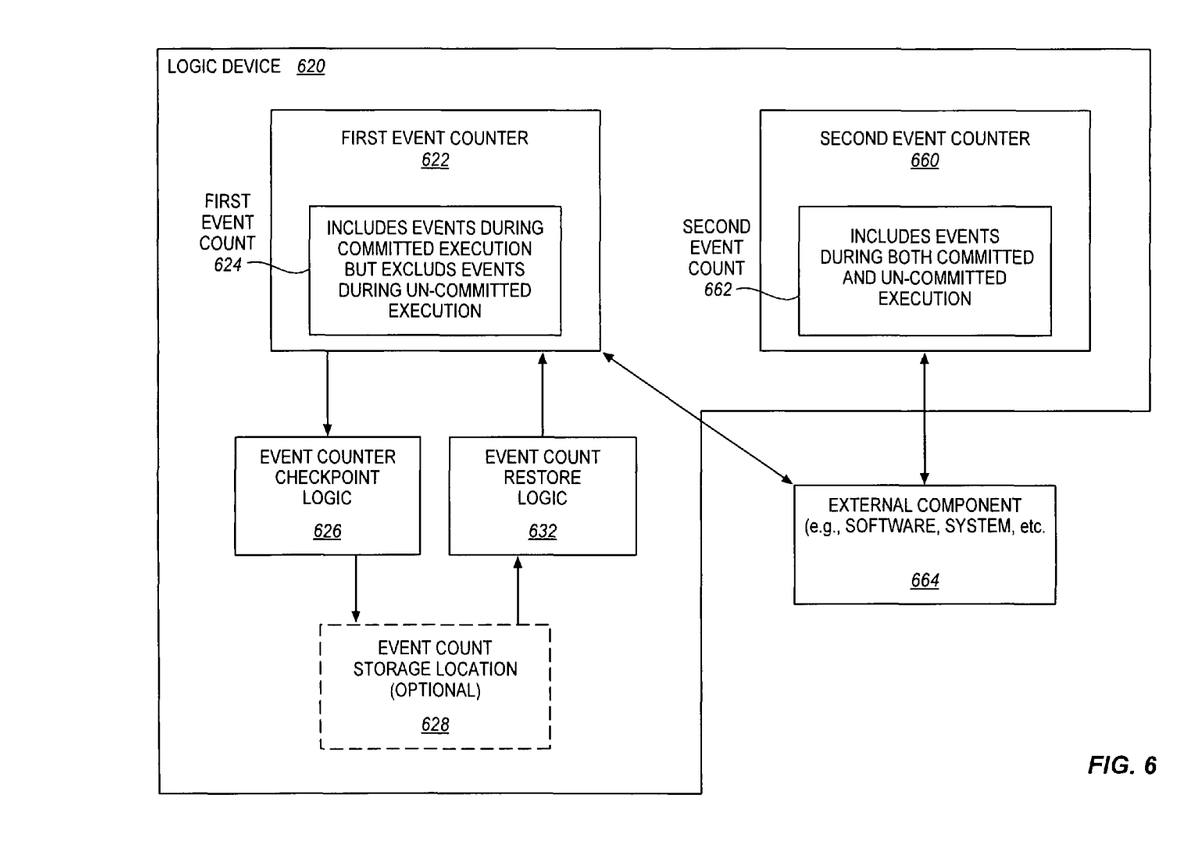
FIG. 6 is a block diagram of an embodiment of a logic device having an embodiment of a first event counter to exclude events during un-committed execution from an event count and an embodiment of a second event counter to include events counted during un-committed execution in an event count.

FIG. 6 is a block diagram of an embodiment of a logic device 620 having an embodiment of a first event counter 622 to exclude events during un-committed execution from an event count 624 and an embodiment of a second event counter 660 to include events counted during un-committed execution in an event count 662.

The logic device has the first event counter 622. The first event counter is operable to maintain a first event count 624. As shown, in one or more embodiments, the first event count 624 may include events counted during committed execution but may exclude events during un-committed execution. Such an event count is not available from single known event counters, and is not easily otherwise determined.

The logic device also has an event counter checkpoint logic 626, an optional event count storage location 628, and an event count restore logic 632. These components may optionally have some or all of the characteristics of the correspondingly named components of the logic device 320 of FIG. 3.

The logic device also has a second event counter 660. In alternate embodiments, there may be three, four, ten, or more event counters. Notice that the second event counter does not have in this embodiment, or at least does not utilize in this embodiment, event counter checkpoint logic and/or event count restore logic. That is, in one or more embodiments, at least one event counter is checkpointed and restored whereas at least one other event counter is not checkpointed and restored. The second event counter is operable to maintain a second event count 662. As shown, in one or more embodiments, the second event count 662 may include events counted during both committed execution and events counted during un-committed execution.

The first event count 624, and the second event count 662, represent different pieces of information about execution within the logic device. As previously mentioned, the first event count includes information that is not available from a single known event counter, and is not easily otherwise determined. It provides information about those events counted during committed execution while excluding events during un-committed execution. Additionally, the combination of the first and second event counts 624, 662 provides additional information. For example, subtracting the first event count 624 from the second event count 662 gives information about how many events were counted during un-committed or aborted execution. This may provide information about essentially wasted execution (e.g., aborted speculative execution due to mispredicted branches and/or aborted speculative execution due to aborted transactional memory execution).

The first and second event counts 624, 662 may be used in different ways. In one or more embodiments, one or more of the first and second event counts may be used to tune or adjust the performance of the logic device. For example, in one or more embodiments, one or more of the first and second event counts may be used to tune or adjust speculative execution of the logic device. Tuning or adjusting the speculative execution may include tuning or adjusting a parameter, algorithm, or strategy. The tuning or adjusting may tune or adjust how aggressive the speculative execution is. As one particular example, if the absolute difference between the first and second event counters (which provides information about events occurring during essentially wasted execution) is higher than average, higher than a threshold, higher than desired, or otherwise considered high, then speculative execution may be decreased, throttled back, turned off, or otherwise tuned or adjusted. Depending upon the implementation, this may be desired in order to reduce heat generation, conserve battery power or other limited power supply, or for other reasons. One or more of the first and second event counts may also or alternatively be used to analyze, optimize, and/or debug code. For example, information about wasted speculative execution may help to allow better branch prediction algorithms to be developed or selected for certain types of processing.

In one or more embodiments, the logic device 620 may include additional logic (not shown) to use one or more of the first and second event counts 624, 662 in any of these various different ways. For example, in one or more embodiments, the logic device may include performance tuning logic and/or speculative execution tuning logic.

In one or more embodiments, an external component 664, which is external to the logic device, may access and/or receive one or more of the first and second event counts 624, 662. In one or more embodiments, the external component may include software. In one aspect, the software may include an operating system or operating system component. In another aspect, the software may include a performance tuning application. In yet another aspect, the software may include a debugger. By way of example, in one or more embodiments, the first and/or the second event counts may be stored in a register or other storage location that may be read, for example, with a machine instruction. In one or more embodiments, the first and/or the second event counts may be used to optimize or at least improve the code so that it executes better (e.g., there is less aborted code). Performance monitoring counters are often used to improve code in this way.

In one or more embodiments, the external component 664 may include hardware. In one aspect, the hardware may include a system (e.g., a computer system, embedded device, network appliance, router, switch, etc.). By way of example, in one or more embodiments, the first and/or the second event counts may be provided as output on a pin or other interface.

Figure 7:
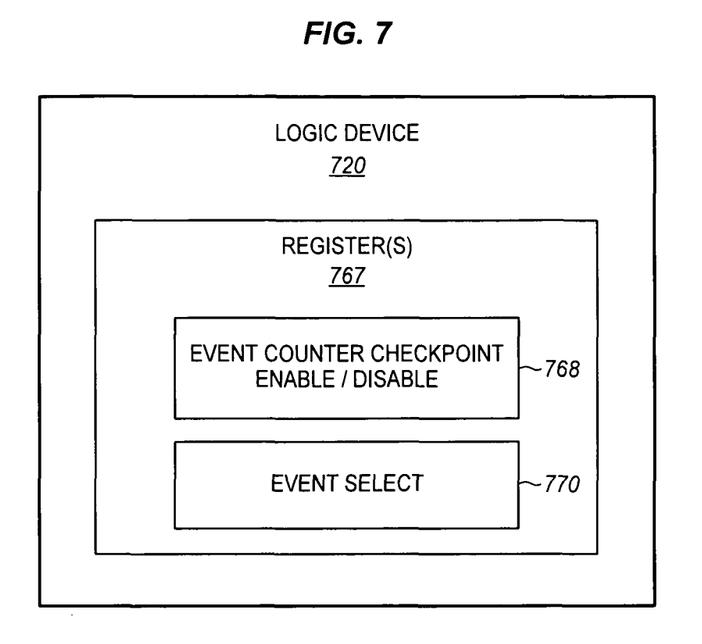
FIG. 7 is a block diagram of an embodiment of a configurable logic device.

FIG. 7 is a block diagram of an embodiment of a configurable logic device 720. The configurable logic device has one or more control and/or configuration registers 767.

In this embodiment, at least one event counter is capable of being enabled or disabled by a user or application for checkpoint and restore. The one or more registers have an event counter checkpoint enable/disable 768 for the at least one event counter. For example, in one particular embodiment, a single bit in a register corresponding to a particular event counter may be set to a value of one (1) to enable event counter checkpointing and restoring as disclosed herein to be performed for that event counter. If desired, a plurality or each event counter may similarly have one or more corresponding bits in one or more corresponding registers to enable or disable event counter checkpointing and restoring for each corresponding event counter. In one or more embodiments, additional bits may be provided for each event counter to specify various different types of event counter checkpointing and restoring, such as, for example, if the checkpointing and restoring is to be performed for aborted speculative execution or some other form of execution to differentiate with respect to.

In this embodiment, at least one event counter is a programmable event counter. The one or more registers have an event select 770 for the at least one programmable event counter. For example, in one particular embodiment, a plurality of bits (e.g., eight bits or sixteen bits, or some other number of bits) may represent a code that encodes a particular type of event to count. If desired, a plurality or each event counter may similarly have a plurality of corresponding bits in one or more corresponding registers to allow event selection for each of the event counters. In one aspect, depending upon the implementation, anywhere from tens to hundreds of different types of events may selected for counting. Alternatively, rather than programmable event counters, fixed event counters that always count the same thing may optionally be used.

Still other embodiments pertain to a computer system, or other electronic device having an event counter and logic and/or performing a method as disclosed herein.

Figure 8:
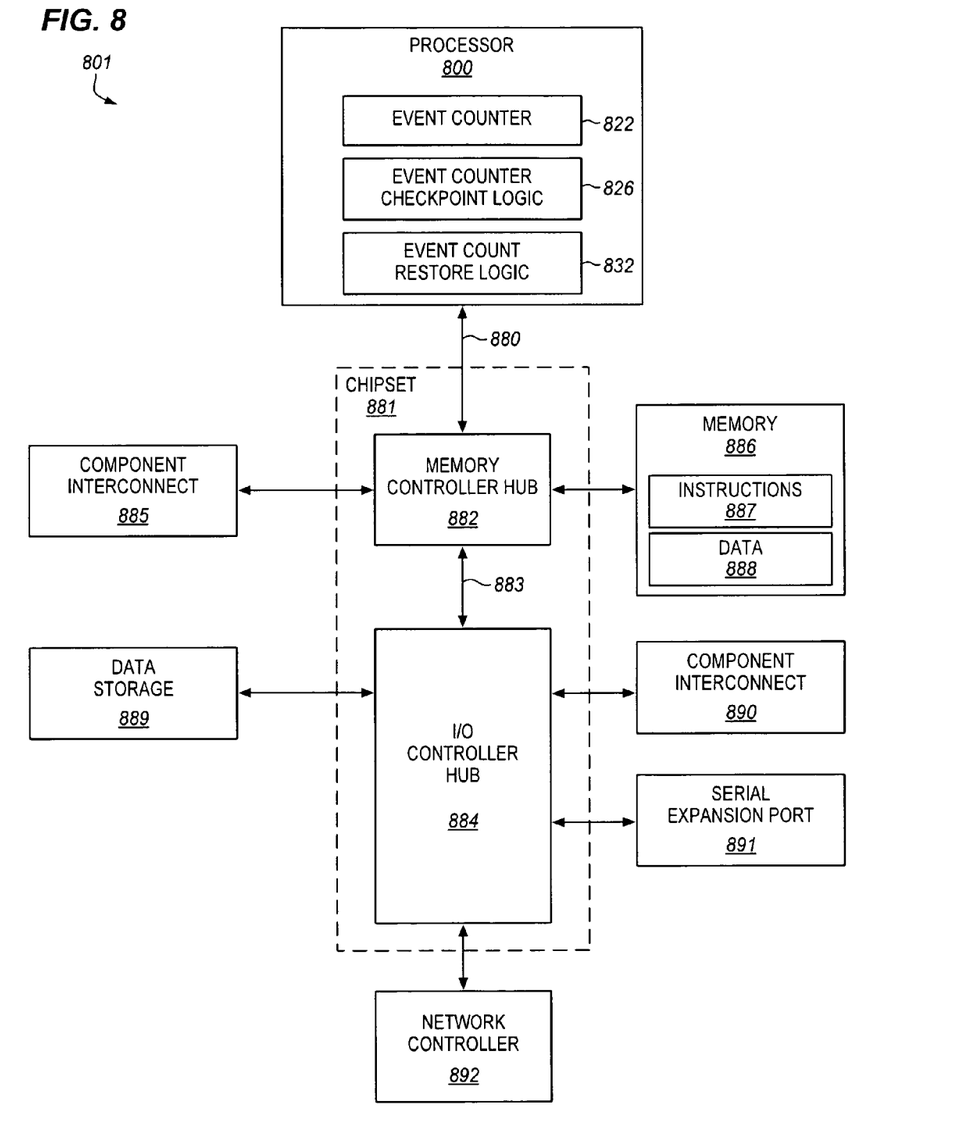
FIG. 8 is a block diagram of a first example embodiment of a suitable computer system.

FIG. 8 is a block diagram of a first example embodiment of a suitable computer system 801. The computer system includes a processor 800. The processor includes an event counter 822, event counter checkpoint, logic 826, and event count restore logic 832. These may be as previously described. In one or more embodiments, the processor may be an out-of-order microprocessor that supports speculative execution. In one or more embodiments, the processor may support speculative execution in transactional memory.

The processor is coupled to a chipset 881 via a bus (e.g., a front side bus) or other interconnect 880. The interconnect may be used to transmit data signals between the processor and other components in the system via the chipset.

The chipset includes a system logic chip known as a memory controller hub (MCH) 882. The MCH is coupled to the front side bus or other interconnect 880.

A memory 886 is coupled to the MCH. In various embodiments, the memory may include a random access memory (RAM). DRAM is an example of a type of RAM used in some but not all computer systems. As shown, the memory may be used to store instructions 887 and data 888.

A component interconnect 885 is also coupled with the MCH. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

The chipset also includes an input/output (I/O) controller hub (ICH) 884. The ICH is coupled to the MCH through hub interface bus or other interconnect 883. In one or more embodiments, the bus or other interconnect 883 may include a Direct Media Interface (DMI).

A data storage 889 is coupled to the ICH. In various embodiments, the data storage may include a hard disk drive, a floppy disk drive, a CD-ROM device, a flash memory device, or the like, or a combination thereof.

A second component interconnect 890 is also coupled with the ICH. In one or more embodiments, the second component interconnect may include one or more peripheral component interconnect express (PCIe) interfaces. The second component interconnect may allow various types of components to be coupled to the rest of the system through the chipset.

A serial expansion port 891 is also coupled with the ICH. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the ICH include, but are not limited to, an audio controller, a wireless transceiver, and a user input device (e.g., a keyboard, mouse).

A network controller is also coupled to the ICH. The network controller may allow the system to be coupled with a network.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. For example, in one or more alternate embodiments, the processor may have multiple cores. As another example, in one or more alternate embodiments, the MCH 882 may be physically integrated on-die with the processor 800 and the processor may be directly coupled with a memory 886 through the integrated MCH. As a further example, in one or more alternate embodiments, other components may be integrated on-die with the processor, such as to provide a system-on-chip (SoC) design. As yet another example, in one or more alternate embodiments, the computer system may have multiple processors.

Figure 9:
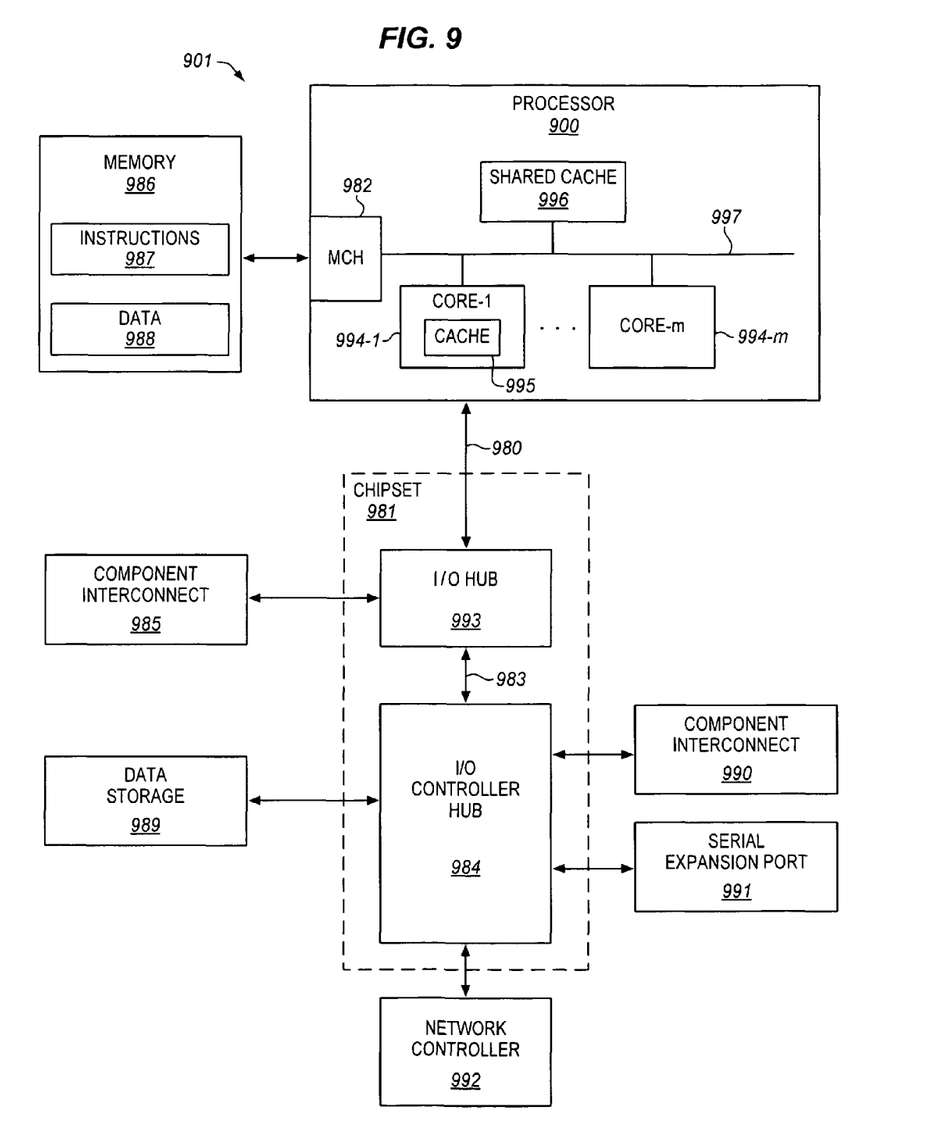
FIG. 9 is a block diagram of a second example embodiment of a suitable computer system.

FIG. 9 is a block diagram of a second example embodiment of a suitable computer system 901. The second example embodiment has certain similarities to the first example computer system described immediate above. For clarity, the discussion will tend to emphasize the differences without repeating all of the similarities.

Similar to the first example embodiment described above, the computer system includes a processor 900, and a chipset 981 having an I/O controller hub (ICH) 984. Also similarly to the first example embodiment, the computer system includes a first component interconnect 985 coupled with the chipset, a second component interconnect 990 coupled with the ICH, a serial expansion port 991 coupled with the ICH, a network controller 992 coupled with the ICH, and a data storage 989 coupled with the ICH.

In this second embodiment, the processor 900 is a multi-core processor. The multi-core processor includes processor cores 994-1 through 994-M, where M may be an integer number equal to or larger than two (e.g. two, four, seven, or more). As shown, the core-1 includes a cache 995 (e.g., an L1 cache). Each of the other cores may similarly include a dedicated cache. The processor cores may be implemented on a single integrated circuit (IC) chip.

In one or more embodiments, at least one, or a plurality or all of the cores may have an event counter, an event counter checkpoint logic, and event count restore logic, as described elsewhere herein. Such logic may additionally, or alternatively, be included outside of a core.

The processor also includes at least one shared cache 996. The shared cache may store data and/or instructions that are utilized by one or more components of the processor, such as the cores. For example, the shared cache may locally cache data stored in a memory 986 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores and the shared cache are each coupled with a bus or other interconnect 997. The bus or other interconnect may couple the cores and the shared cache and allow communication.

The processor also includes a memory controller hub (MCH) 982. As shown in this example embodiment, the MCH is integrated with the processor 900. For example, the MCH may be on-die with the processor cores. The processor is coupled with the memory 986 through the MCH. In one or more embodiments, the memory may include DRAM, although this is not required.

The chipset includes an input/output (I/O) hub 993. The I/O hub is coupled with the processor through a bus (e.g., a QuickPath Interconnect (QPI)) or other interconnect 980. The first component interconnect 985 is coupled with the I/O hub 993.

This is just one particular example of a suitable system. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or an execution unit as disclosed herein are generally suitable.

One or more embodiments include an article of manufacture that includes a tangible machine-accessible and/or machine-readable medium. The medium may include, a mechanism that provides, for example stores, information in a form that is accessible by the machine. For example, the medium may optionally include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof. The tangible medium may include one or more solid materials to store information. The medium may store and provide instructions, which, if processed by a machine, may result in and/or cause the machine to perform one or more of the operations or methods disclosed herein.

In one or more embodiments, the medium may provide instructions that if processed by the machine cause or result in the machine reading an event count of an event counter that is configured to omit events counted during aborted speculative execution from the event count. In one or more embodiments, the medium may further include instructions to cause the machine to adjusting a performance parameter of the machine (for example a speculative execution parameter) based on the event count. In one or more embodiments, the medium may further include instructions to cause the machine to read a second event count corresponding to a second event counter that is configured to include events counted during the aborted speculative execution in the event count. In one or more embodiments, the medium may further include instructions to cause the machine to evaluating a difference between the second event count and the event count. In one or more embodiments, the instructions may include instructions or code of an operating system.

Suitable machines include, but are not limited to, general-purpose processors, special-purpose processors (e.g., graphics processors, network communications processors), network devices, computer systems, personal digital assistants (PDAs), and a wide variety of other types of electronic devices.

Certain operations disclosed herein may be performed by hardware components (for example a circuit). The circuit or hardware may be part of a general-purpose or special-purpose processor, or logic circuit, to name just a few examples. The operations may also optionally be performed by a combination of hardware and/or firmware and/or software.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

It will also be appreciated, by one skilled in the art, that modifications may be made to the embodiments disclosed herein, such as, for example, to the sizes, shapes, configurations, forms, functions, materials, and manner of operation, and assembly and use, of the components of the embodiments. All equivalent relationships to those illustrated in the drawings and described in the specification are encompassed within embodiments of the invention.

For simplicity and clarity of illustration, elements illustrated in the figures have not necessarily been drawn to scale. For example, the dimensions of some of the elements are exaggerated relative to other elements for clarity. Further, where considered appropriate, reference numerals or terminal portions of reference numerals have been repeated among the figures to indicate corresponding or analogous elements, which may optionally have similar characteristics.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
    storing, prior to a transactional execution that executes operations while allowing concurrent access to a shared resource of a logic device, an event count of a first event counter programmed to count events of a programmed type of a plurality of programmed types that occur during execution within the logic device;
    restoring the first event counter to the stored event count after the first event counter has counted additional events and after aborting the transactional execution;
    subtracting, in view of the aborting the transactional execution, the stored event count of the first event counter from a second event count of a second event counter that counts events of the programmed type occurring prior to and during the transactional execution, wherein the second event count of the second event counter to continue incrementing without resetting after the aborting the transactional execution; and
    providing a result of the subtracting as a number of the additional events that were counted during the aborted transactional execution.

2. The method of claim 1, wherein the first event counter counted the additional events during the transactional execution.

3. The method of claim 2, further comprising tuning the transactional execution based at least in part on an event count of the first event counter.

4. The method of claim 2, wherein the transactional execution comprises execution associated with the shared resource without having a lock on the shared resource.

5. The method of claim 1, wherein the transactional execution comprises execution within a transactional memory region.

6. The method of claim 1:
    wherein the second event count comprises the additional events that were counted during the aborted transactional execution in the second event count.

7. The method of claim 1, wherein said restoring the first event counter comprises restoring a programmable event counter of a general-purpose microprocessor having a plurality of cores, and wherein the first event counter is to count events selected from cache references, cache misses, and bus accesses.

8. The method of claim 1, further comprising configuring the logic device so that the stored event count is stored and restored, wherein the logic device is also cable of being configured so that the stored event count is not stored and restored.

9. An apparatus comprising:
    a first event counter to count events of a programmed type of a plurality of programmed types that occur during execution within a logic device, wherein the first event counter comprises a performance monitoring counter;
    event counter checkpoint logic coupled with the first event counter, the event counter checkpoint logic operable to store, prior to a transactional execution that executes operations while allowing concurrent access to a shared resource of the logic device, a first event count of the first event counter;
    event count restore logic coupled with the first event counter, the event count restore logic operable to restore the first event counter to the stored first event count after aborting the transactional execution;

a second event counter to count events of the programmed type prior to and during the transactional execution in a second event count, wherein the second event counter continues incrementing the second event count without resetting after the aborting the transactional execution; and tuning logic coupled with the first event counter and the second event counter, the tuning logic to:
subtract, in view of the aborting the transactional execution, the stored first event count of the first event counter from the second event count of the second event counter; and
provide a result of the subtracting as a number of additional events that were counted during the aborted transactional execution.

10. The apparatus of claim 9, wherein the transactional execution comprises execution associated with the shared resource without having a lock on the shared resource.

11. The apparatus of claim 9, wherein the transactional execution comprises execution within a transactional memory.

12. The apparatus of claim 9:
wherein the second event counter to include events counted during the aborted transactional execution in the second event count.

13. The apparatus of claim 9, wherein the first event counter comprises a programmable event counter of processor that has been programmed to count events of a particular programmed type of a plurality of possible types, and wherein the event counter checkpoint logic comprises circuitry.

14. The apparatus of claim 9, wherein the first event counter is included within a general-purpose microprocessor having a plurality of cores, and wherein the event counter is to count events selected from cache references, cache misses, and bus accesses.

15. The apparatus of claim 9, further comprising event counter checkpoint enable/disable logic to allow checkpointing of the first event counter to be configured as either enabled or disabled.

16. A system comprising:
an interconnect;
a processor coupled with the interconnect, the processor including:
a first event counter to count events that occur during execution within a logic device, wherein the first event counter;
a first event counter to count events of a programmed type of a plurality of programmed types that occur during execution within the processor, wherein the first event counter comprises a performance monitoring counter, and wherein the first event counter is to count events selected from cache references, cache misses, and bus accesses
event counter checkpoint logic coupled with the first event counter, the event counter checkpoint logic operable to store, prior to a transactional execution that executes operations while allowing concurrent access to a shared resource of the processor, a first event count of the first event counter;
event count restore logic coupled with the first event counter, the event count restore logic operable to restore the first event counter to the stored first event count after aborting the transactional execution;
a second event counter to count events of the programmed type prior to and during the transactional execution in a second event count, wherein the second event counter continues incrementing the second event count without resetting after the aborting the transactional execution; and
tuning logic coupled with the first event counter and the second event counter, the tuning logic to:
subtract, in view of the aborting the transactional execution, the stored first event count of the first event counter from the second event count of the second event counter; and
provide a result of the subtracting as a number of additional events that were counted during the aborted transactional execution; and
a dynamic random access memory (DRAM) coupled with the interconnect.

17. The system of claim 16, wherein the transactional execution comprises speculative lock elision.

18. The system of claim 16, wherein the event count restore logic comprises circuitry, and wherein the first event counter is included within a general-purpose microprocessor having a plurality of cores.

19. A non-transitory machine-readable storage medium to store instructions that if executed result in a processor performing operations including:
reading a first event count of a first event counter that is configured to exclude events counted during un-committed transactional execution from the first event count, wherein the first event counter comprises a performance monitoring counter, to be programmed to count events of a programmed type of a plurality of programmed types that occur during execution within the processor, and wherein the transactional execution to execute operations while allowing concurrent access to a shared resource of the processor;
reading a second event count of a second event counter that is configured to include the events counted during the un-committed transactional execution and event occurring prior to the un-committed transactional execution, wherein the second event count of the second event counter to continue incrementing without resetting after aborting the transactional execution; and
subtracting, in view of the aborting the transactional execution, the first event count from the second event count; and
providing a result of the subtracting as a number of the additional events that were counted during the aborted transactional execution.

20. The non-transitory machine-readable storage medium of claim 19, wherein the instructions that if executed result in the processor performing said reading the first event count comprise instructions of an operating system.

21. The non-transitory machine-readable storage medium of claim 19, wherein the operations further comprise:
adjusting a performance parameter of the processor based on the first event count.

22. The non-transitory machine-readable storage medium of claim 19, wherein the operations further comprise:
adjusting a transactional execution parameter of the processor based on the first event count.

23. The non-transitory machine-readable storage medium of claim 19, wherein the operations further comprise:
evaluating a difference between the second event count and the first event count.

* * * * *